United States Patent
Ando et al.

(10) Patent No.: US 12,030,181 B2
(45) Date of Patent: Jul. 9, 2024

(54) METHOD AND SYSTEM FOR MEASURING THREE-DIMENSIONAL GEOMETRY OF ATTACHMENT

(71) Applicant: Yushin Precision Equipment Co., Ltd., Kyoto (JP)

(72) Inventors: Kazutaka Ando, Kyoto (JP); Fumitake Watanabe, Kyoto (JP)

(73) Assignee: YUSHIN PRECISION EQUIPMENT CO., LTD., Kyoto (JP)

( * ) Notice: Subject to any disclaimer, the term of this patent is extended or adjusted under 35 U.S.C. 154(b) by 406 days.

(21) Appl. No.: 17/213,662

(22) Filed: Mar. 26, 2021

(65) Prior Publication Data

US 2021/0299856 A1  Sep. 30, 2021

(30) Foreign Application Priority Data

Mar. 31, 2020 (JP) .................................. 2020-64836

(51) Int. Cl.
| | |
|---|---|
| *B25J 9/02* | (2006.01) |
| *B25J 9/16* | (2006.01) |
| *G01B 11/00* | (2006.01) |

(52) U.S. Cl.
CPC ............. *B25J 9/023* (2013.01); *B25J 9/1697* (2013.01); *G01B 11/005* (2013.01)

(58) Field of Classification Search
CPC ... B25J 9/023; B25J 9/02; B25J 9/0096; B25J 9/10; B25J 9/123; B25J 9/1697; B25J 9/1694; B25J 9/16; G01B 11/005; G01B 11/002; G01B 11/007; G01B 11/02; G01B 11/022; G01B 11/028; G01B 11/03;

(Continued)

(56) References Cited

U.S. PATENT DOCUMENTS 6,414,711 B2  7/2002 Arimatsu et al.
2003/0094717 A1* 5/2003 Kachnic .............. B29C 45/7626
425/169

(Continued)

FOREIGN PATENT DOCUMENTS

DE     20219713 U1  2/2004
DE   102016121831 B3  1/2018

(Continued)

OTHER PUBLICATIONS

Japanese Office Action (Issue Date: Jul. 21, 2023; Mailing Date: Aug. 1, 2023), Japanese Application JP 2020-064836, English translation included, 6 pages.

(Continued)

*Primary Examiner* — Lisa M Caputo
*Assistant Examiner* — Eric Sebastian Von Wald
(74) *Attorney, Agent, or Firm* — Rankin, Hill & Clark LLP

(57) ABSTRACT

The three-dimensional geometry of an attachment is measured before work is started. A maximum dimension of a take-out head 60 in the X direction, a maximum dimension of the take-out head 60 in the Y direction, and a maximum dimension of the take-out head 60 in the Z direction are measured on the basis of an image of the take-out head 60 captured by at least imaging devices C11 and C12 before the take-out head 60 starts work with the take-out head 60 being mounted to an elevating frame 59B of an apparatus 5 for taking out a molded product, as an orthogonal three-axis robot.

13 Claims, 11 Drawing Sheets

(58) Field of Classification Search
CPC .................. G01B 11/04; G01B 11/06; G05B 2219/41062; H04N 1/19505; H04N 1/19526
See application file for complete search history.

(56) References Cited

U.S. PATENT DOCUMENTS

| | | | | |
|---|---|---|---|---|
| 2009/0248353 | A1* | 10/2009 | Chang | G01B 11/005 702/152 |
| 2011/0004343 | A1* | 1/2011 | Iida | B25J 9/10 901/47 |
| 2012/0294961 | A1* | 11/2012 | Ishibashi | B29C 45/42 425/139 |
| 2014/0160115 | A1* | 6/2014 | Keitler | H04N 9/3194 345/419 |
| 2017/0314910 | A1* | 11/2017 | Ikebuchi | G06T 7/73 |
| 2020/0078989 | A1* | 3/2020 | Shiode | B29C 33/0061 |
| 2020/0316782 | A1* | 10/2020 | Chavez | G06T 7/12 |

FOREIGN PATENT DOCUMENTS

| | | | | |
|---|---|---|---|---|
| JP | 9-70780 | A | 3/1997 | |
| JP | 2002-120175 | | 4/2002 | |
| JP | 2006-350602 | A | 12/2006 | |
| JP | 2019079344 | A * | 5/2019 | ........ G05B 19/0405 |
| JP | 6647649 | B1 * | 2/2020 | |

OTHER PUBLICATIONS

Japanese Office Action (Issue Date: Oct. 30, 2023; Mailing Date: Nov. 7, 2023), Japanese Application JP 2020-064836, English translation included, 6 pages.

* cited by examiner

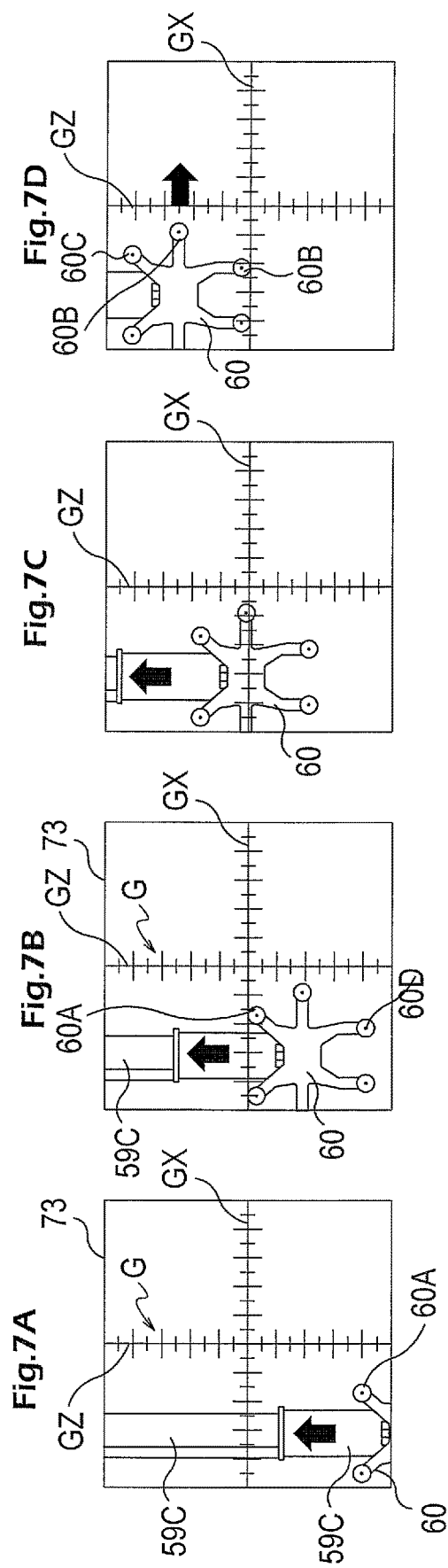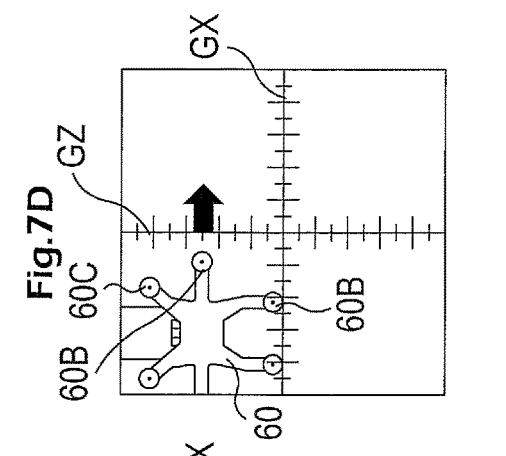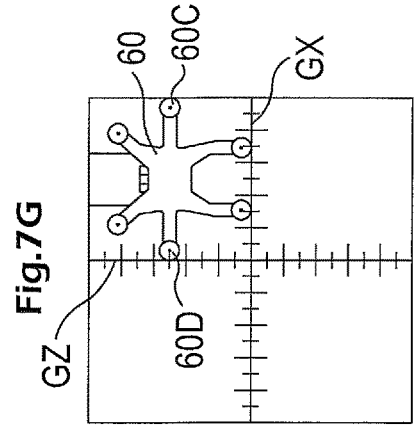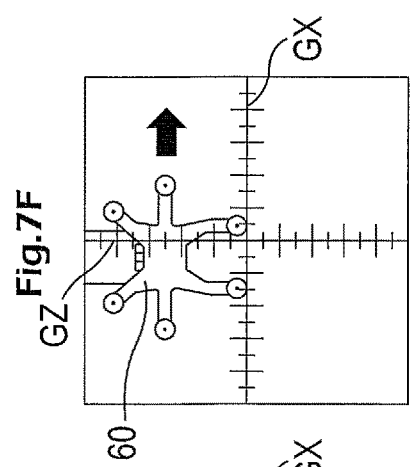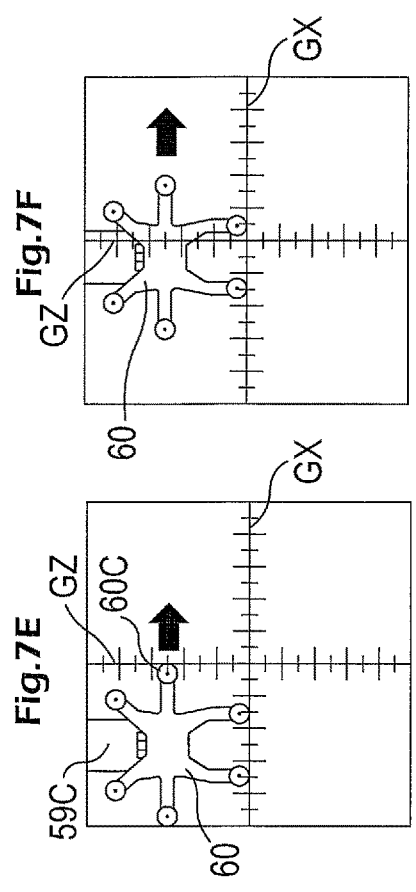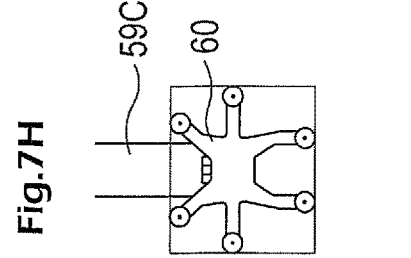

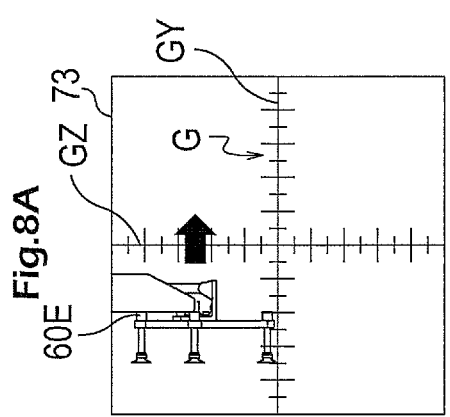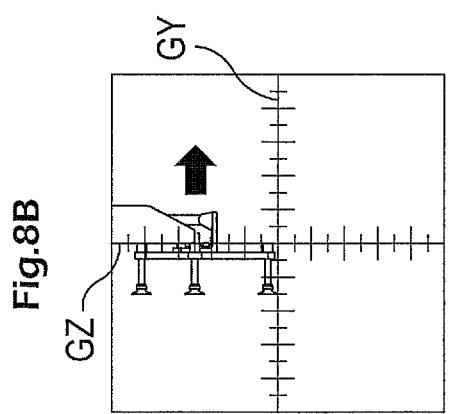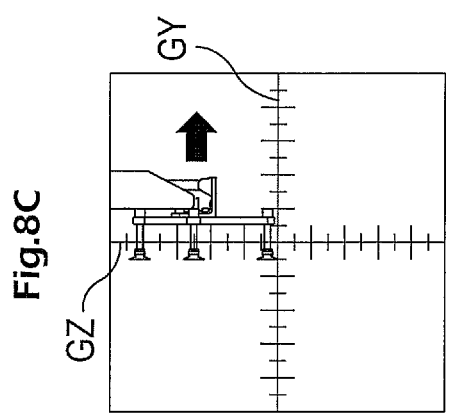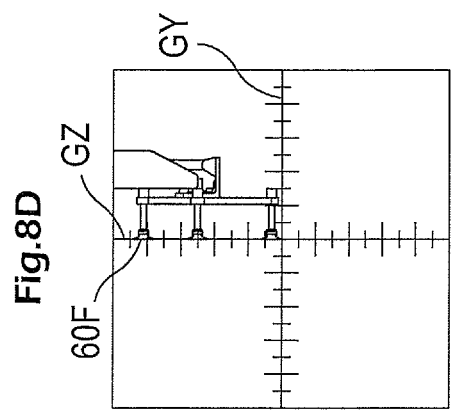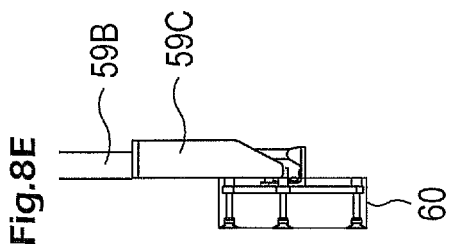

METHOD AND SYSTEM FOR MEASURING THREE-DIMENSIONAL GEOMETRY OF ATTACHMENT

TECHNICAL FIELD

The present invention relates to a method and system for measuring the three-dimensional geometry of an attachment mounted to a work frame of an orthogonal three-axis robot, a method of determining the possibility of use of an attachment using the method, and a method of teaching or a die change of an apparatus for taking out a molded product.

BACKGROUND ART

Japanese Unexamined Patent Application Publication No. 2002-120175 (Patent Document 1), for example, discloses an invention related to teaching of an apparatus for taking out a molded product as an example of an orthogonal three-axis robot. In the related art, when taking out a molded product from a die of a molding machine, an operator performs setting work for a teaching program while moving a take-out head (attachment), which is mounted to an approach frame of the apparatus for taking out a molded product, while seeing the relationship between the take-out head and the die such that the take-out head does not collide with the die. In addition, when a take-out head and a die that have been used are to be used again (when a die change is performed), confirmation work as to whether or not the teaching program used previously can be used, as it is, is performed.

[Patent Document 1] Japanese Unexamined Patent Application Publication No. 2002-120175

SUMMARY OF INVENTION

TECHNICAL PROBLEM

When the above work is performed, the take-out head occasionally collides with the die to damage the die. This problem is caused by an assumption by the operator that the status of installation of the die in the molding machine and the mounting state of constituent parts of the take-out head are invariable at all times. In reality, however, the mounting state of the take-out head is not always constant, and the constituent parts of the take-out head are varied in shape because of maintenance, replacement, or repair. Under such circumstances, a high degree of proficiency and a sharp eye are required from the operator to perform teaching work without collision between the die and the take-out head.

The above problem of collision can also occur with orthogonal three-axis robots other than an orthogonal three-axis robot applied to an apparatus for taking out a molded product.

It is an object of the present invention to provide a method that enables taking appropriate measures before an orthogonal three-axis robot starts work, even, if the dimensions or the mounting state of an attachment mounted to a work frame of the robot is different, by measuring the three-dimensional geometry of the attachment with the attachment being mounted to the work frame before the attachment starts work.

It is another object of the present invention to provide a method of determining the possibility of use of an attachment, in which it is determined, on the basis of the three-dimensional geometry of the attachment measured using the method according to the present invention, whether or not the mounted attachment can be used, and a method of teaching or a die change of an apparatus for taking out a molded product, in which the teaching or the die change is stopped when an alarm is issued by the method of determining the possibility of use of an attachment.

SOLUTION TO THE PROBLEM

The present invention is directed to a method of measuring three-dimensional geometry of an attachment mounted to a work frame of an orthogonal three-axis robot having operation shafts extending in an X direction, a Y direction, and a Z direction. In the present invention, a maximum dimension of the attachment in the X direction, a maximum dimension of the attachment in the Y direction, and a maximum dimension of the attachment in the Z direction are measured on the basis of an image of the attachment captured by at least one imaging device before the attachment starts work with the attachment being mounted to the work frame of the orthogonal three-axis robot. Parts mounted to the attachment, which is mounted to the work frame of the orthogonal three-axis robot, are often replaced with parts different from those according to the design specifications for repair, or the arrangement posture of such parts is occasionally varied for maintenance. If the work frame is an approach frame of an apparatus for taking out a molded product, for example, the attachment mounted to the approach frame is constituted with an accessory part including an air tube for providing power to the attachment or a wire for providing a control signal or power to the attachment. Therefore, the position and the posture of the air tube or the wire may be varied each time the attachment is replaced. The operator may mount a wrong attachment to the work frame. Even in such cases, a change in the shape of the attachment to be actually used can be determined, before work performed using the attachment is actually started, by measuring the actual maximum dimensions of the attachment in the X, Y, and Z directions with the attachment mounted to the work frame. As a result, it is possible to detect, beforehand, collision of the attachment with a part etc. located in the movement path or mounting of a wrong attachment.

A known measurement technique may be used to measure maximum dimensions on the basis of images. It is possible to minimize a measurement error due to the difference in the degree of proficiency among operators. When captured image data are used, maximum dimensions can be also measured by comparing a normal image of the attachment and a captured image thereof to measure maximum dimensions automatically or using AI technology which is good at image recognition. As a result, measurement can be automated.

Preferably, a three-dimensional position coordinate of the at least one imaging device at a time of capturing an image of the attachment, a three-dimensional position coordinate of the attachment of which an image is captured, a field angle of the imaging device, and a mounting posture of the attachment to the work frame are determined so that the image includes information needed to measure the three-dimensional geometry of the attachment. As more information such as coordinate information, the field angle of the imaging device, and the mounting posture is available beforehand, computation for measurement of the maximum dimensions on the basis of the image can be facilitated, and computation for correction of the image data on the basis of the difference in the mounting position and the mounting posture of the imaging device can be reduced.

If the orthogonal three-axis robot is an apparatus for taking out a molded product, the work frame is an approach frame operable to advance into a die of a molding machine with the attachment being mounted to a distal end of the approach frame. In this case, a pull-out direction in which the die mounted to the molding machine is pulled out may be defined as the Y direction, an up-down direction that is orthogonal to the pull-out direction may be defined as the Z direction, and a direction that is orthogonal to the Y direction and the Z direction may be defined as the X direction. The maximum dimension of the attachment in the Y direction, the maximum dimension of the attachment in the Z direction, and the maximum dimension of the attachment in the X direction may be measured on the basis of data on the image of the attachment captured by at least one imaging device before the attachment is inserted into the die with the attachment being mounted to the approach frame.

For example, the maximum dimensions can be measured using the following method. In this method, in order to measure maximum dimensions in accordance with an operation by an operator, an imaging system including the at least one imaging device uses a first imaging device configured to obtain a first image of the attachment in such a posture that allows measurement of the maximum dimension of the attachment in the X direction and the maximum dimension of the attachment in the Z direction, a second imaging device configured to obtain a second image of the attachment in such a posture that allows measurement of the maximum dimension of the attachment in the Y direction and the maximum dimension of the attachment in the Z direction, and an image display device that includes a screen with indicators on orthogonal coordinate axes for displaying the first image or the second image. The screen with indicators on orthogonal coordinate axes is a screen with an image of two dimensional gauges extending along two orthogonal axes.

In this method, the orthogonal three-axis robot uses a Y-direction drive source operable to move the work frame in the Y direction, a Y-direction movement amount measurement unit, a Z-direction drive source operable to move the work frame in the Z direction, a Z-direction movement amount measurement unit, an X-direction drive source operable to move the work frame in the X direction, and an X-direction movement amount measurement unit. The maximum dimension in the Z direction is measured on the basis of a distance measured by the Z-direction movement amount measurement unit during a period since an outermost end portion, on one side in the Z direction, of the attachment in the first image crosses a reference line on the screen until an outermost end portion, on the other side in the Z direction, of the attachment crosses the reference line while the attachment is moved in the Z direction by driving the Z-direction drive source with directions in which the orthogonal coordinate axes for the indicators on the screen extend coinciding with the X direction and the Z direction in the first image. The maximum dimension in the X direction is measured on the basis of a distance measured by the X-direction movement amount measurement unit during a period since an outermost end portion, on one side in the X direction, of the attachment in the first image crosses a reference line on the screen until an outermost end portion, on the other side in the X direction, of the attachment crosses the reference line while the attachment is moved in the X direction by driving the X-direction drive source with directions in which the orthogonal coordinate axes for the indicators on the screen extend coinciding with the X direction and the Z direction in the first image. The maximum dimension in the Y direction is measured on the basis of a distance measured by the Y-direction movement amount measurement unit during a period since an outermost end portion, on one side in the Y direction, of the attachment in the second image crosses a reference line on the screen until an outermost end portion, on the other side in the Y direction, of the attachment crosses the reference line while the attachment is moved in the Y direct by driving the Y-direction drive source with directions in which the orthogonal coordinate axes for the indicators on the screen extend coinciding with the Y direction and the Z direction in the second image. With this method, it is possible to measure maximum dimensions using simple equipment and through an easy operation.

The maximum dimensions may be measured using, as the imaging device, a three-dimensional imaging device configured to measure an object surface to output dot group data including a large number of dots each having a three-dimensional coordinate. In this case, the three-dimensional imaging device acquires first dot group data that allows measurement of the maximum dimension of the attachment in the X direction and the maximum dimension of the attachment in the Z direction, and second dot group data that allow measurement of the maximum dimension of the attachment in the Y direction and the maximum dimension of the attachment in the Z direction. The maximum dimension in the Z direction is measured on the basis of a coordinate of a dot positioned at an outermost end, on one side in the Z direction, among the dots in the first dot group data, and a coordinate of a dot positioned at an outermost end, on the other side in the Z direction, among the dots in the first dot group data. In addition, the maximum dimension in the X direction is measured on the basis of a coordinate of a dot positioned at an outermost end, on one side in the X direction, among the dots in the first dot group data, and a coordinate of a dot positioned at an outermost end, on the other side in the X direction, among the dots in the first dot group data. Further, the maximum dimension in the Y direction is measured on the basis of a coordinate of a dot positioned at an outermost end, on one side in the Y direction, among the dots in the second dot group data, and a coordinate of a dot positioned at an outermost end, on the other side in the Y direction, among the dots in the second dot group data.

The measured maximum dimensions may be used as desired. There may be provided a method of determining a possibility of use of an attachment, including determining, on the basis of the information on the three-dimensional geometry of the attachment, whether or not use of the attachment in the work is appropriate, and issuing an alarm if the attachment is not usable. Whether or not the use of the attachment is appropriate is determined on the basis of a possibility of a collision of the attachment with a surrounding object during movement of the attachment, or a difference of the information from previous dimension information, for example. The present invention is also applicable to a method of teaching or a die change of an apparatus for taking out a molded product, including stopping the teaching or the die change when an alarm is issued by the method of determining a possibility of use of an attachment.

The present invention provides a system for measuring three-dimensional geometry of an attachment, including a processor. The processor constitutes a dimension measurement section for measuring a maximum dimension of the attachment in the X direction, a maximum dimension of the attachment in the Y direction, and a maximum dimension of the attachment in the Z direction on the basis of an image of the attachment captured by at least one imaging device before the attachment starts work with the attachment being mounted to the work frame of the orthogonal three-axis robot. It is assumed that the orthogonal three-axis robot is a robot for taking out a molded product, and that the work frame is an approach frame operable to advance into a die of a molding machine with the attachment being mounted to a distal end of the approach frame. Then, a pull-out direction in which the die mounted to the molding machine is pulled out is defined as the Y direction, an up-down direction that is orthogonal to the pull-out direction is defined as the Z direction, and a direction that is orthogonal to the Y direction and the Z direction is defined as the X direction. In this case, the dimension measurement section includes a dimension computation section configured to measure, through computation, the maximum dimension of the attachment in the Y direction, the maximum dimension of the attachment in the Z direction, and the maximum dimension of the attachment in the X direction on the basis of image data on the attachment captured by at least one imaging device before the attachment is inserted into the die with the attachment being mounted to the approach frame.

In the system for measuring three-dimensional geometry of an attachment, an imaging system including the at least one imaging device may include a first imaging device configured to obtain a first image of the attachment in such a posture that allows measurement of the maximum dimension of the attachment in the X direction and the maximum dimension of the attachment in the Z direction, a second imaging device configured to obtain a second image of the attachment in such a posture that allows measurement of the maximum dimension of the attachment in the Y direction and the maximum dimension of the attachment in the Z direction, and an image display device that includes a screen with indicators on orthogonal coordinate axes for displaying the first image or the second image. In this case, the orthogonal three-axis robot includes a Y-direction drive source operable to move the work frame in the Y direction, a Y-direction movement amount measurement unit, a Z-direction drive source operable to move the work frame in the Z direction, a Z-direction movement amount measurement unit, an X-direction drive source operable to move the work frame in the X direction, and an X-direction movement amount measurement unit. The dimension computation section is configured to measure, through computation, the maximum dimension in the Z direction on the basis of a distance measured by the Z-direction movement amount measurement unit during a period since an outermost end portion, on one side in the Z direction, of the attachment in the first image crosses a reference line on the screen until an outermost end portion, on the other side in the Z direction, of the attachment crosses the reference line while, the attachment is moved in the Z direction by driving the Z-direction drive source with directions in which the orthogonal coordinate axes for the indicators on the screen extend coinciding with the X direction and the Z direction in the first image. The dimension computation section is also configured to measure, through computation, the maximum dimension in the X direction on the basis of a distance measured by the X-direction movement amount measurement unit during a period since an outermost end portion, on one side in the X direction, of the attachment in the first image crosses a reference line on the screen until an outermost end portion, on the other side in the X direction, of the attachment crosses the reference line while the attachment is moved in the X direction by driving the X-direction drive source with directions in which the orthogonal coordinate axes for the indicators on the screen extend coinciding with the X direction and the Z direction in the first image. The dimension computation section is further configured to measure, through computation, the maximum dimension in the Y direction on the basis of a distance measured by the Y-direction movement amount measurement unit during a period since an outermost end portion, on one side in the Y direction, of the attachment in the second image crosses a reference line on the screen until an outermost end portion, on the other side in the Y direction, of the attachment crosses the reference line while the attachment is moved in the Y direction by driving the Y-direction drive source with directions in which the orthogonal coordinate axes for the indicators on the screen extend coinciding with the Y direction and the Z direction in the second image.

The system for measuring three-dimensional geometry of an attachment may use, as the imaging device, a three-dimensional imaging device configured to measure an object surface to output dot group data including a large number of dots each having a three-dimensional coordinate. In this case, the system further includes a first dot group data acquisition section configured to acquire, from the three-dimensional imaging device, first dot group data that allow measurement of the maximum dimension of the attachment in the X direction and the maximum dimension of the attachment in the Z direction, and a second dot group data acquisition section configured to acquire second dot group data that allow measurement of the maximum dimension of the attachment in the Y direction and the maximum dimension of the attachment in the Z direction. The dimension computation section includes a maximum dimension determination section configured to calculate the maximum dimension in the Z direction on the basis of a coordinate of a dot positioned at an outermost end, on one side in the Z direction, among the dots in the first dot group data, and a coordinate of a dot positioned at an outermost end, on the other side in the Z direction, among the dots in the first dot group data, calculate the maximum dimension in the X direction on the basis of a coordinate of a dot positioned at an outermost end, on one side in the X direction, among the dots in the first dot group data, and a coordinate of a dot positioned at an outermost end, on the other side in the X direction, among the dots in the first dot group data, and calculate the maximum dimension in the Y direction on the basis of a coordinate of a dot positioned at an outermost end, on one side in Y direction, among the dots in the second dot group data, and a coordinate of a dot positioned at an outermost end, on the other side in the Y direction, among the dots in the second dot group data.

BRIEF DESCRIPTION OF DRAWINGS

FIG. 7A through FIG. 7H are image display for illustrating a method according to an embodiment.

FIG. 8A through FIG. 8E are image display for illustrating the method according to the embodiment.

DESCRIPTION OF EMBODIMENTS

Figure 1:
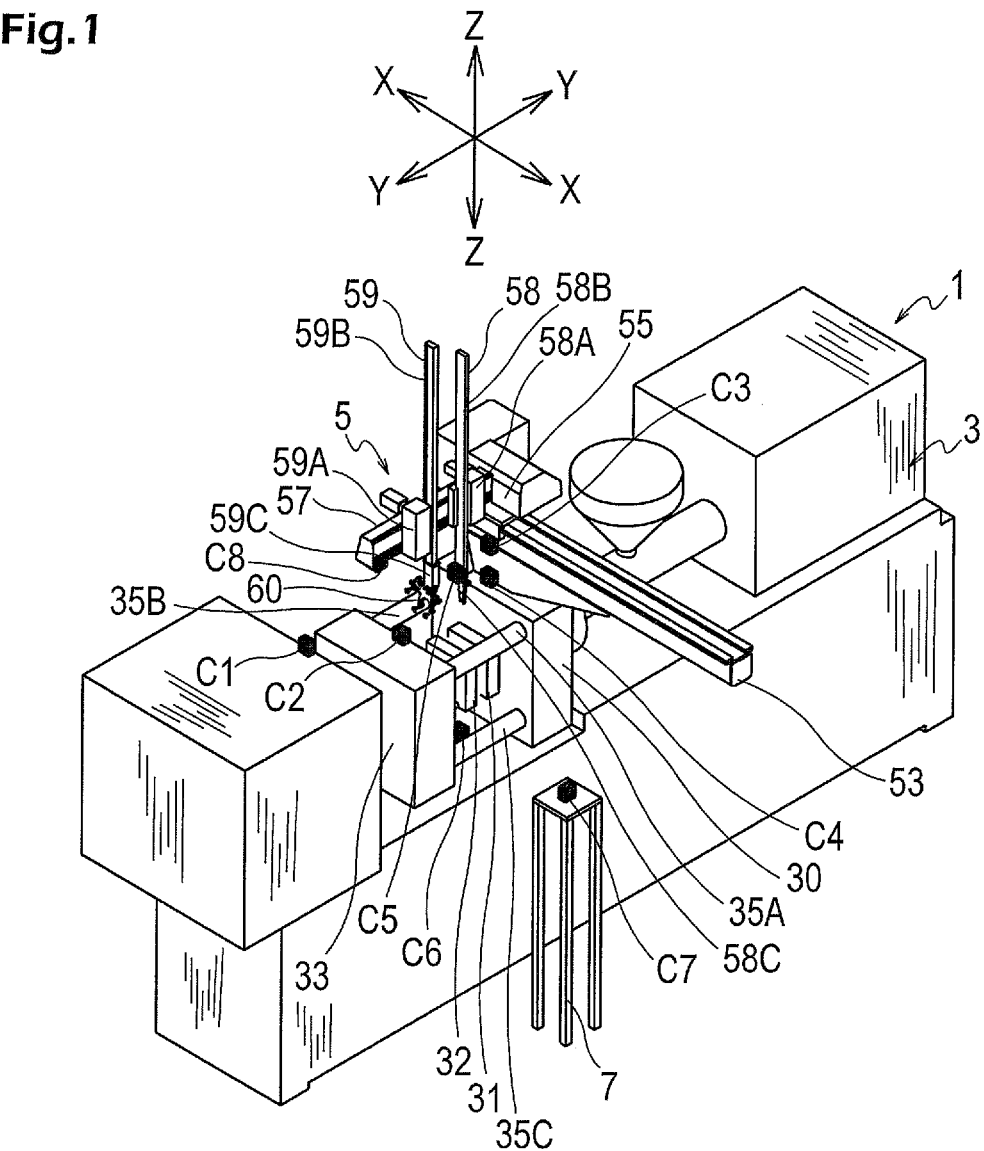
FIG. 1 is a perspective view of a molded product manufacturing system including an orthogonal three-axis robot which has operation shafts extending in the X direction, the Y direction, and the Z direction and to which a method of measuring the three-dimensional geometry of an attachment according to the present invention is applied.
Figure 2:
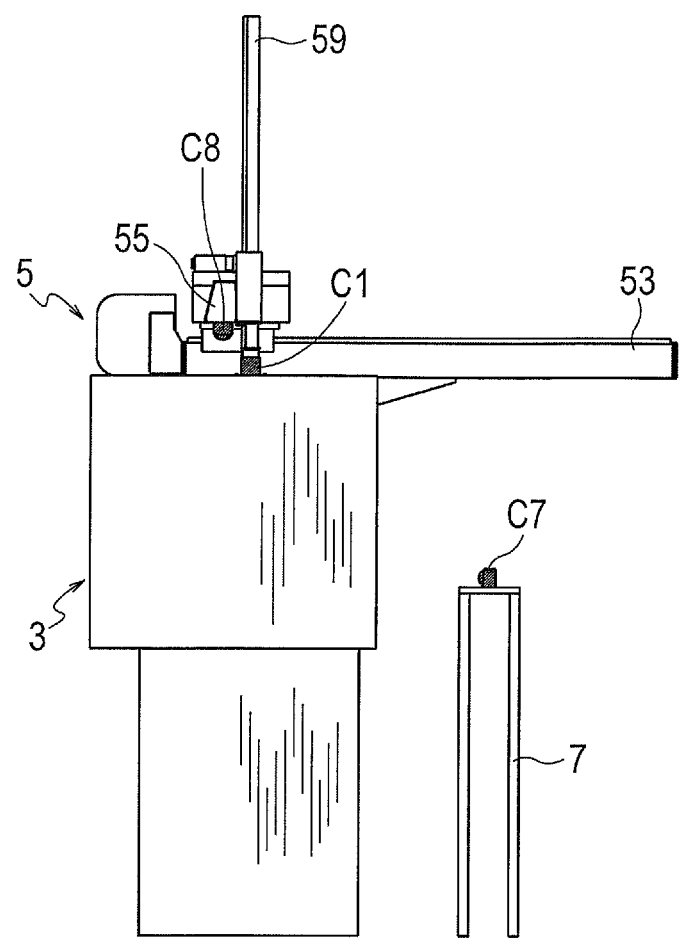
FIG. 2 is a left side view of the molded product manufacturing system.
Figure 3:
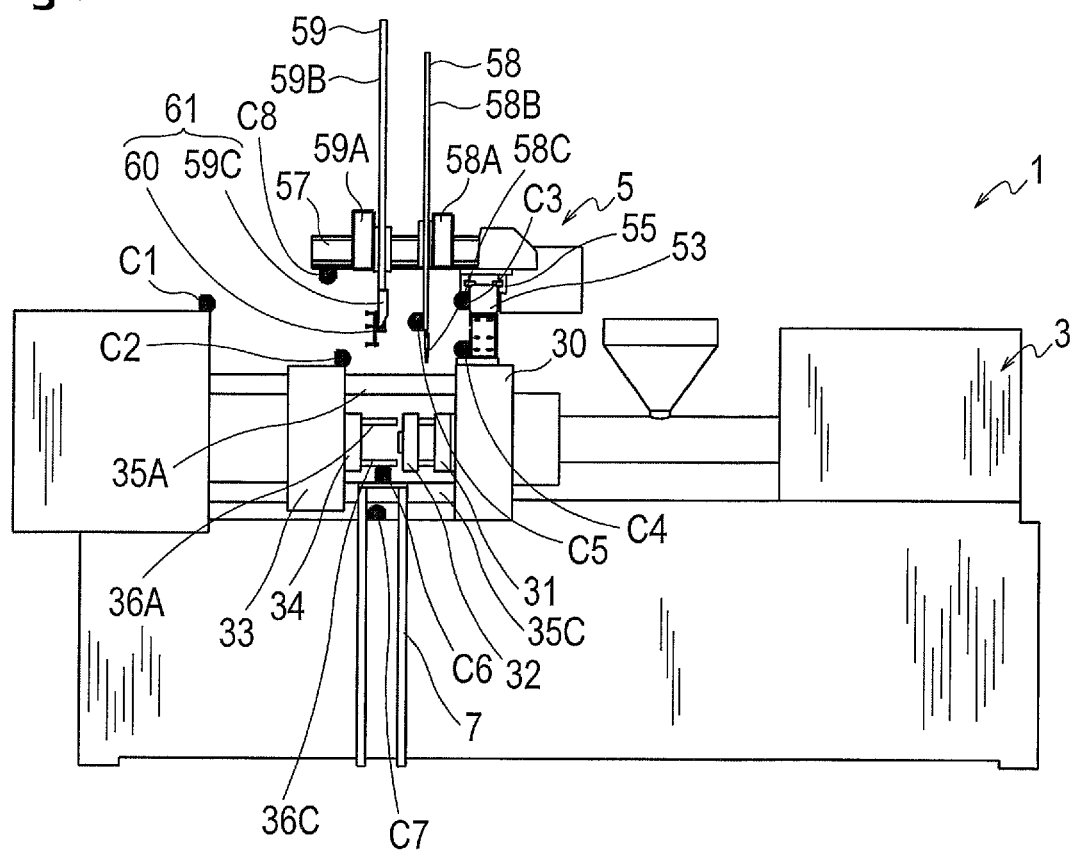
FIG. 3 is a front view of the molded product manufacturing system.
Figure 4:
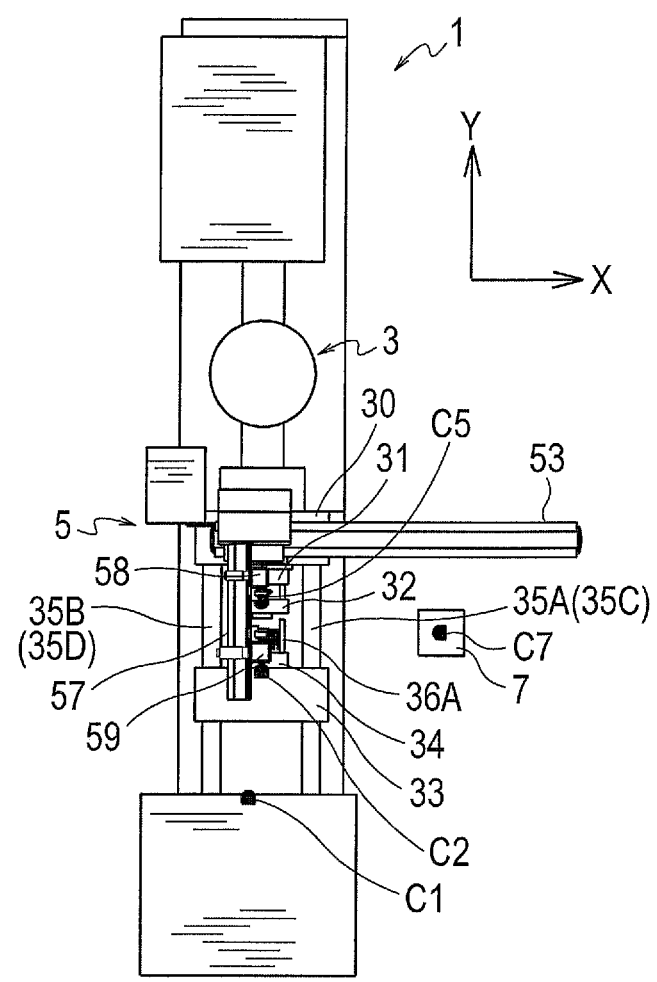
FIG. 4 is a plan view of the molded product manufacturing system.

An embodiment of the present invention will be described in detail below with reference to the drawings. FIGS. 1 to 4 are a perspective view, a left side view, a front view, and a plan view, respectively, of a molded product manufacturing system 1 including an orthogonal three-axis robot which has operation shafts extending in the X direction, the Y direction, and the Z direction and to which a method of measuring the three-dimensional geometry of an attachment according to the present invention is applied. In FIG. 1, the X direction, the Y direction, and the Z direction which are used in the present embodiment are indicated. The molded product manufacturing system 1 is constituted by assembling a molding machine 3 operable to manufacture a resin molded product and an apparatus 5 for taking out a molded product, as the orthogonal three-axis robot. The apparatus 5 is a traverse-type apparatus for taking out a molded product. A base portion of the apparatus 5 is supported by a fixed platen 30 of the resin molding machine 3.

A fixed die 31 and an intermediate die 32 are fixed to the fixed platen 30 of the molding machine 3. A movable die 34 is fixed to a movable platen 33. Four tie bars 35A to 35D are disposed between the fixed platen 30 and the movable platen 33 to guide movement of the movable platen 33. The four tie bars 35A to 35D are disposed at equal intervals. A virtual center line that passes through the center of the four tie bars 35A to 35D passes through the center (nozzle center) of the fixed die 31 and the moveable die 34. The fixed die 31, the intermediate die 32, and the movable die 34 are guided by guide pins 36A to 36D. The four guide pins 36A to 36D are also disposed at equal intervals. A virtual center line that passes through the center of the four guide pins 36A to 36D also passes through the center (nozzle center) of the fixed die 31 and the movable die 34.

The apparatus 5 includes a transverse shaft 53, a first transfer body 55, a pull-out shaft 57, a runner elevating unit 58, and a molded product-suctioning elevating unit 59. The transverse shaft 53 has a cantilever beam structure in which the transverse shaft 53 extends in the X direction which is horizontal and orthogonal to the longitudinal direction of the molding machine 3. The first transfer body 55 is supported by the transverse shaft 53, and advanced and retracted in the X direction along the transverse shaft 53 by a drive source formed by an AC servomotor included in a servomechanism. The pull-out shaft 57 is provided on the first transfer body 55 to extend in the Y direction which is parallel to the longitudinal direction of the molding machine. The runner elevating unit 58 and the molded product-suctioning elevating unit 59 are supported on the pull-out shaft 57 to be movable in the Y direction by a drive source formed by an AC servomotor included in the servomechanism. The runner elevating unit 58 is structured to include an elevating frame 58B provided on a travelling body 58A, which is movably supported on the pull-out shaft 57, to be elevated and lowered in the Z direction. A travelling body 59A is driven by an AC servomotor to be moved in the Y direction. The elevating frame 58B is elevated and lowered in the up-down direction (Z direction) by a drive source. The elevating frame 58B includes a chuck 58C that serves as an attachment for holding a runner to be wasted.

The travelling body 59A which is included in the molded product-suctioning elevating unit 59 is driven by an AC servomotor to be moved in the Y direction on the pull-out frame 57. The molded product-suctioning elevating unit 59 includes an elevating frame 59B, a reverse unit 59C, and a take-out head 60. The elevating frame 59B is elevated and lowered in the up-down direction (Z direction) by a drive source. The reverse unit 59C serves as a posture controller to be rotated about the axis of the elevating frame 59B. The take-out head 60 is provided on the reverse unit 59C. In the present embodiment, maximum dimensions of the take-out head 60 as the attachment are measured.

In the present embodiment, in order to make a trial search for a preferable installation position, eight imaging devices C1 to C8 are installed at various portions of the apparatus 5 and the molding machine 3 and on a stand 7 placed at a side of the molding machine 3. Two-dimensional cameras or three-dimensional cameras are used as the imaging devices C1 to C8. In the present embodiment, a necessary image can be obtained by selecting one of the imaging devices C1 to C8 that provides a preferable image.

Figure 5:
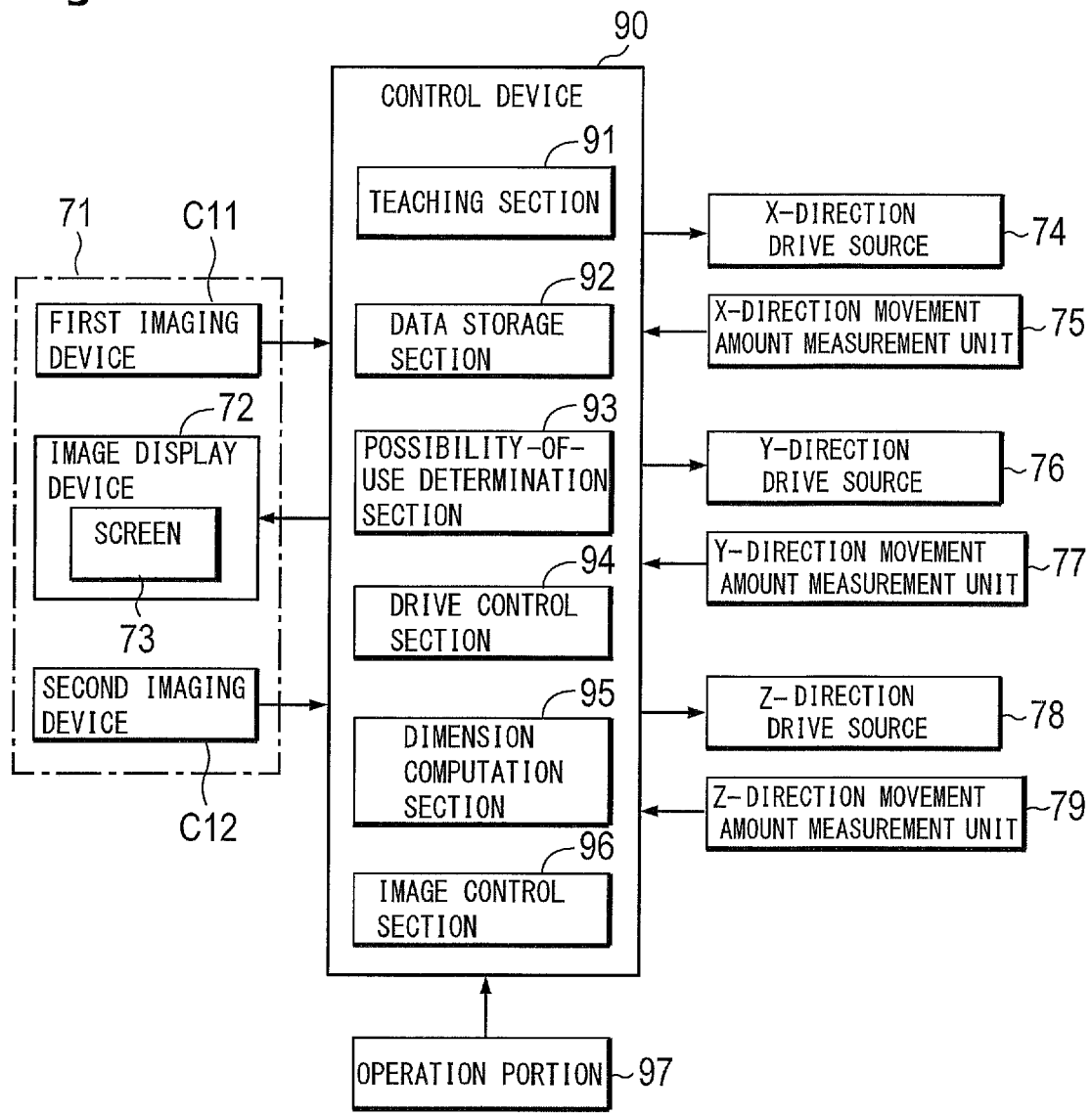
FIG. 5 is a block diagram illustrating the configuration of a measurement system constructed in a control system for an apparatus for taking out a molded product, in order to apply the method of measuring the three-dimensional geometry of an attachment.
Figure 6:
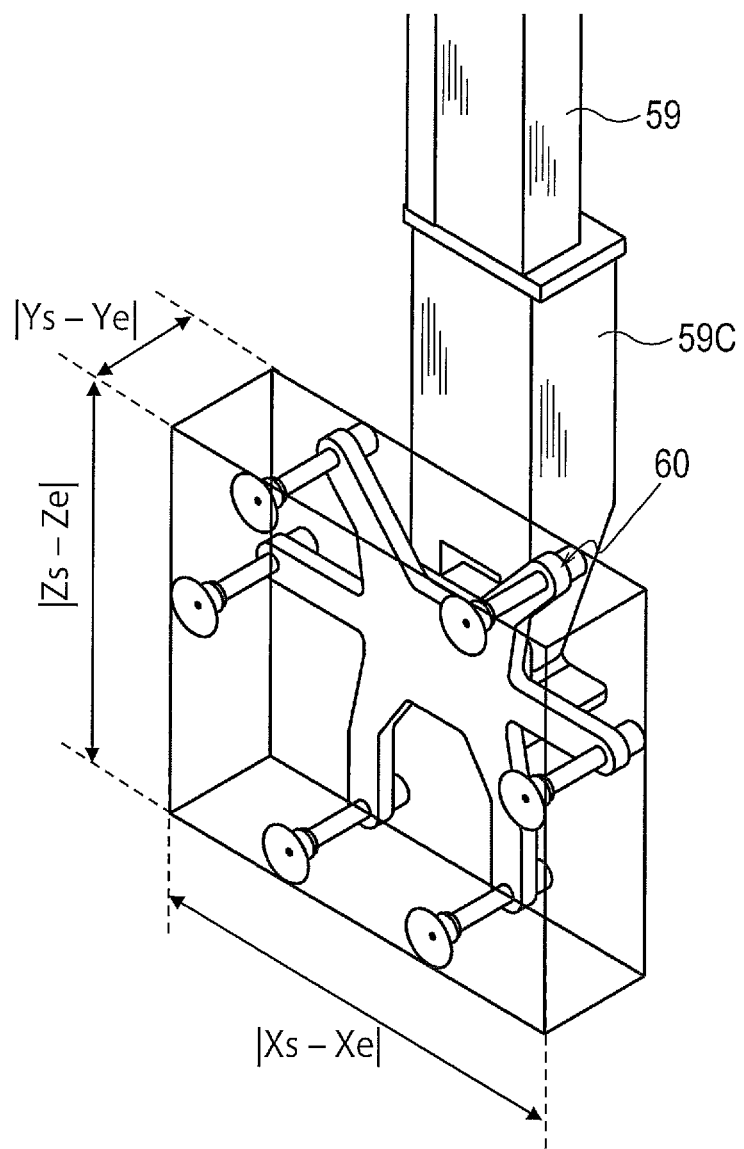
FIG. 6 indicates the maximum dimensions of a take-out head.

FIG. 5 is a block diagram illustrating the configuration of a measurement system constructed in a control system 1 for the apparatus 5, in order to apply the method of measuring the three-dimensional geometry of an attachment according to the present embodiment. FIG. 6 indicates the maximum dimensions of the take-out head 60. FIGS. 7A-8E are image display for illustrating the method according to the present embodiment.

In the method according to the present embodiment, a maximum dimension of the take-out head 60, as the attachment, in the X direction, a maximum dimension of the take-out head 60 in the Y direction, and a maximum dimension of the take-out head 60 in the Z direction are measured on the basis of an image of the take-out head 60 captured by at least one of the imaging devices (C1 to C8) before the take-out head 60 starts work with the take-out head 60 being mounted to the elevating frame 59B, as the work frame, of the apparatus 5, as the orthogonal three-axis robot. Preferably, the three-dimensional position coordinate of the at least one imaging device at the time of capturing an image of the take-out head 60, the three-dimensional position coordinate of the take-out head 60 of which an image is captured, the field angle of the imaging device, and the mounting posture of the take-out head 60 to the elevating frame 59B (work frame) are determined so that the image captured by the imaging device includes information needed to measure the three-dimensional geometry of the take-out head 60, depending on the measurement method to be used. As more information such as coordinate information, the field angle of the imaging device, and the mounting posture is available beforehand, computation for measurement of the maximum dimensions on the basis of the image can be facilitated, and computation for correction of the image data on the basis of the difference in the mounting position and the mounting posture of the imaging device can be reduced.

When measurement is performed using the system illustrated in the block diagram in FIG. 5, in order to measure maximum dimensions in accordance with an operation by an operator, an imaging system 71 including the at least one imaging device includes a first imaging device C11 configured to obtain a first image of the take-out head 60 in such a posture that allows measurement of the maximum dimension of the take-out head 60 in the X direction and the maximum dimension of the take-out head 60 in the 2 direction, a second imaging device C12 configured to obtain a second image of the take-out head 60 in such a posture that allows measurement of the maximum dimension of the take-out head 60 in the Y direction and the maximum dimension of the take-out head 60 in the Z direction, and an image display device 72 that includes a screen 73 with indicators on orthogonal coordinate axes for displaying the first image or the second image. The screen 73 with indicators on orthogonal coordinate axes is a gauge screen having two orthogonal axes (GZ-GX, GZ-GY).

In the present embodiment, an X-direction drive source 74 and an X-direction movement amount measurement unit 75 configured to move the elevating frame 59B in the X direction, a Y-direction drive source 76 and a Y-direction movement amount measurement unit 75 configured to move the elevating frame 59B in the Y direction, and a Z-direction drive source 78 and a Z-direction movement amount measurement unit 79 configured to move the elevating frame 59B in the Z direction are used. The operator performs the following operation using an operation portion 97 constituted of an operation switch etc. provided on a controller. In the following operation, image display on the screen 73 of the image display device 72 is performed by an image control section 96 in a control device 90 constituted in a control section for the apparatus 5. The control device 90 includes a processor configured to implement a dimension computation section 95 that constitutes the dimension measurement section. Computation of maximum dimensions is performed by the dimension computation section 95, as the dimension measurement section, on the basis of outputs from the X-direction movement amount measurement unit 75 to the Z-direction movement amount measurement unit 79. A drive control section 94 outputs an operation command for the X-direction drive source 75 to the Z-direction drive source 78 in accordance with an operation from the operation portion 97. The control device 90 further includes a teaching section 91 configured to perform an operation for teaching to be described later, a data storage section 92 configured to store teaching data, and a possibility-of-use determination section 93.

Specifically, the imaging device C1 or C2 illustrated in FIGS. 1 to 4 can be used as the first imaging device C11, if the posture of the take-out head 60 is not varied. The first imaging device C11 captures an image of the take-out head 60, as the attachment, from the front. Meanwhile, the imaging devices C6 to C8 illustrated FIGS. 1 to 4 can be used as the second imaging device C12, if the posture of the take-out head 60 is not varied. The imaging devices C1 to C5 illustrated in FIGS. 1 to 4 can be used if the posture of the take-out head 60 is varied. The first imaging device C11 captures an image of the take-out head 60, as the attachment, from the front. The second imaging device C12 captures an image of the take-out head 60 from a side.

Specifically, as illustrated in FIG. 7A-7H, the direction in which orthogonal coordinate axes GZ and GX for indicators G on the screen 73 extend and the X direction and the Z direction in the first image from the first imaging device C11 are caused to coincide with each other. This state is established while seeing an image of the screen 73 and an image of the indicator G. Then, the maximum dimension in the Z direction is computed on the basis of the distance [see Zs-Ze in FIG. 6] measured by the Z-direction movement amount measurement unit 79, which is constituted of an encoder etc., during a period since an outermost end portion 60A, on one side in the Z direction, of the take-out head 60 in the first image crosses a reference line (GX in the present example) on the screen (the value measured at this time is defined at Zs) until an outermost end portion 60B, on the other side in the Z direction, of the take-out head 60 crosses the reference line (GX in the present example) (the value measured at this time is defined as Ze) [FIGS. 7A to 7D] while the take-out head 60 is moved in the Z direction by driving the Z-direction drive source 78, which is constituted of a servomotor etc.

In addition, the maximum dimension in the X direction is measured on the basis of the distance [see Xs-Xe in FIG. 6] measured by the X-direction movement amount measurement unit during a period since an outermost end portion 60C, on one side in the X direction, of the take-out head 60 in the first image crosses a reference line (GZ in the present example) on the screen (the value measured at this time is defined as Xs) until an outermost end portion 60D, on the other side in the X direction, of the take-out head 60 crosses the reference line (GZ) (the value measured at this time is defined as Xe) while the take-out head 60 is moved in the X direction by driving the X-direction drive source 74 with directions in which the orthogonal coordinate axes GZ and GY for the indicators G on the screen 73 extend coinciding with the X direction and the Z direction in the first image.

Further, the maximum dimension in the Y direction is measured on the basis of the distance [see Ys-Ye in FIG. 6] measured by the Y-direction movement amount measurement unit during a period since an outermost end portion 60E, on one side in the Y direction, of the take-out head 60 in the second image crosses a reference line (GZ in the present example) on the screen (the value measured at this time is defined as Ys) until an outermost end portion 60F, on the other side in the Y direction, of the take-out head 60 crosses the reference line (GZ) (the value measured at this time is defined as Ye) while the take-out head 60 is moved in the Y direction by driving the Y-direction drive source 76 with directions in which the orthogonal coordinate axes GZ and GY for the indicators G on the screen 73 extend coinciding with the Y direction and the Z direction in the second image (side image).

With this method, it is possible to measure maximum dimensions in the X direction, the Y direction, and the Z direction using simple equipment and through an easy operation. Parts mounted to the take-out head 60, which is mounted to the elevating frame 59B of the apparatus 5, are often replaced with parts different from those according to the design specifications for repair, or the arrangement posture of such parts is occasionally varied for maintenance. For example, the take-out head 60 which is mounted to the elevating frame 59B, as the work frame, is constituted with an accessory part including an air tube for providing power to the take-out head 60 or a wire. Therefore, the position and the posture of the air tube or the wire may be varied each time the take-out head 60 is replaced. The operator may mount a wrong take-out head to the elevating frame 59B. Even in such cases, a change in the shape of the take-out head 60 to be actually used can be determined, before take-out work performed using the take-out head 60 is actually started, by measuring the maximum dimensions of the take-out head 60 in the X, Y, and Z directions with the take-out head 60 mounted to the elevating frame 59B. As a result, it is possible to detect, beforehand, collision of the take-out head 60 with a part etc. located in the movement path or mounting of a wrong take-out head.

(Other Measurement Systems)

Figure 9:
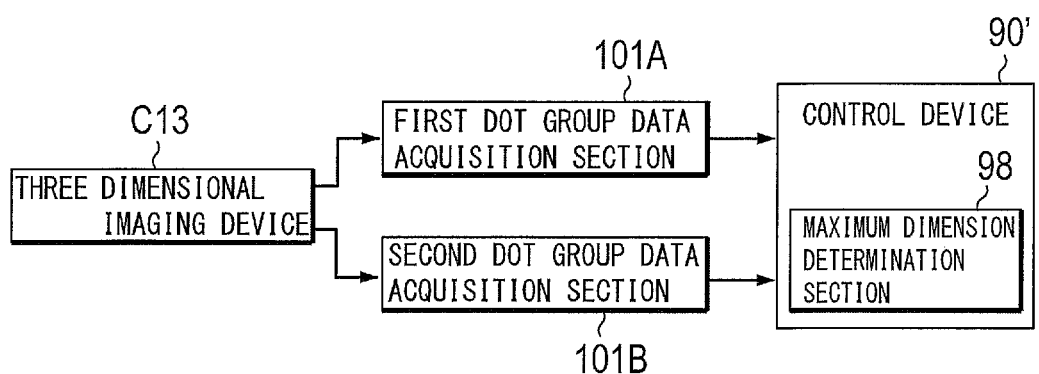
FIG. 9 is a block diagram illustrating the configuration of a measurement system that is used to measure maximum dimensions using a single three-dimensional imaging device as an imaging device.

FIG. 9 is a block diagram illustrating the configuration of a measurement system that is used to measure maximum dimensions using a single three-dimensional imaging device C13 as the imaging device. In this measurement system, maximum dimensions are measured using, as the imaging device, the three-dimensional imaging device C13 which measures an object surface to output dot group data including a large number of dots each having a three-dimensional coordinate. A first dot group data acquisition section 101A acquires, from image data obtained when the three-dimensional imaging device C13 captures an image of the take-out head 60 from the front, first dot group data that allow measurement of the maximum dimension of the take-out head 60 in the X direction and the maximum dimension of the take-out head 60 in the Z direction. Meanwhile, a second dot group data acquisition section 101B acquires, from image data obtained when the three-dimensional imaging device C13 captures an image of the take-out head 60 from a side, second dot group data that allow measurement of the maximum dimension of the take-out head 60 in the Y direction and the maximum dimension of the take-out head 60 in the Z direction. When a single three-dimensional imaging device is used, the imaging device C1 in FIG. 1 may be used as the three-dimensional imaging device, and may acquire a front image and thereafter rotate the take-out head 60 by 90 degrees using the reverse unit 59C, as the posture change device, to acquire a side image. As a matter of course, two three-dimensional imaging devices may be used to obtain a front image and a side image.

A maximum dimension determination section 98, as the dimension computation section constituted by a processor in a control device 90', measures the maximum dimension in the Z direction on the basis of the coordinate of a dot positioned at the outermost end, on one side in the Z direction, among the dots in the first dot group data, and the coordinate of a dot positioned at the outermost end, on the other side in the Z direction, among the dots in the first dot group data. The maximum dimension determination section 98 also measures the maximum dimension in the X direction on the basis of the coordinate of a dot positioned at the outermost end, on one side in the X direction, among the dots in the first dot group data, and the coordinate of a dot positioned at the outermost end, on the other side in the X direction, among the clots in the first dot group data. The maximum dimension determination section 98 further measures the maximum dimension in the Y direction on the basis of the coordinate of a dot positioned at the outermost end, on one side in the Y direction, among the dots in the second dot group data, and the coordinate of a dot positioned at the outermost end, on the other side in the Y direction, among the dots in the second dot group data.

Figure 10A:
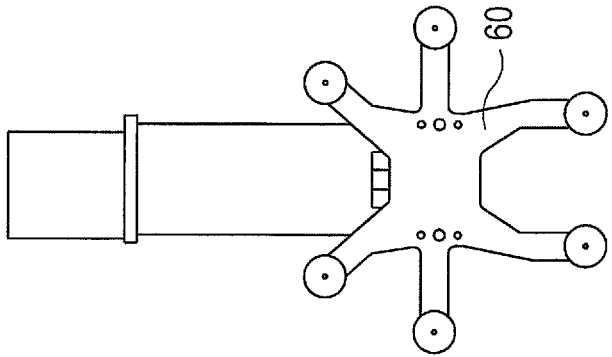
FIGS. 10A to 10D illustrate a case where maximum dimensions in the X direction and the Z direction are measured using dot group data.
Figure 10B:
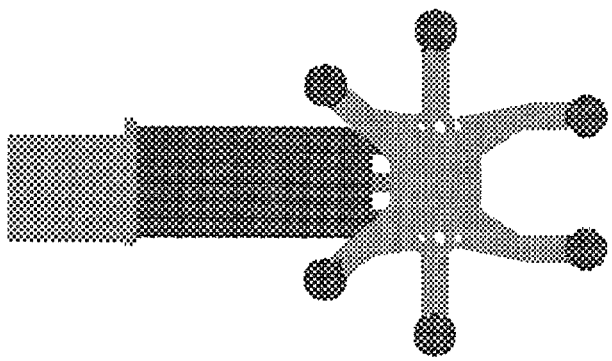
Figure 10C:
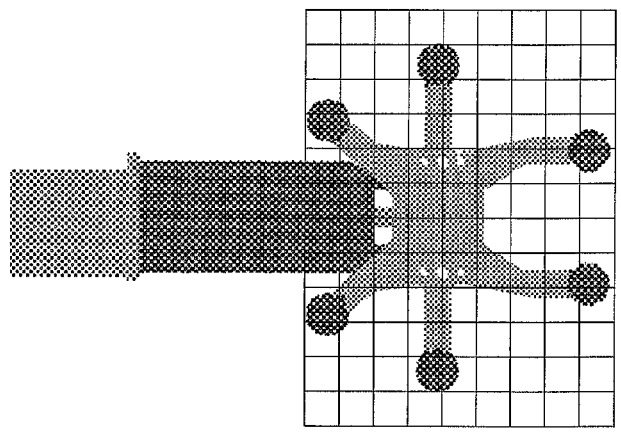
Figure 10D:
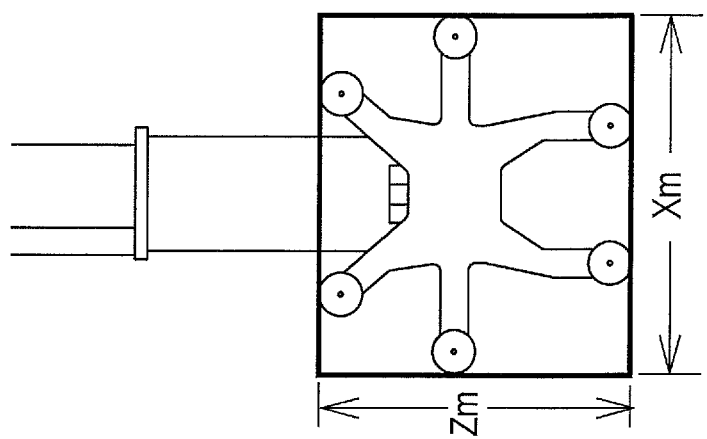
Figure 11:
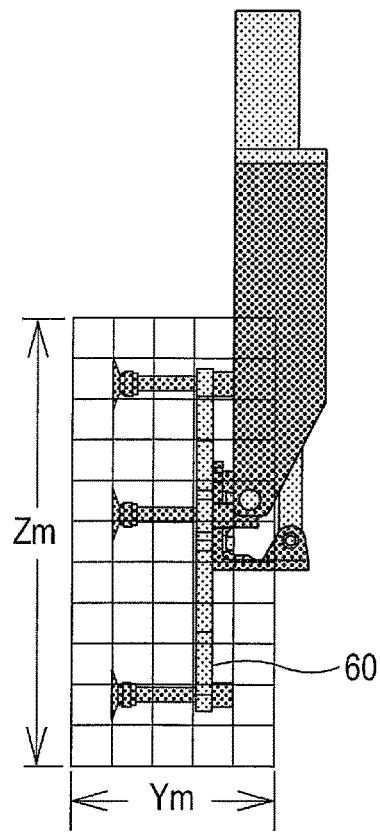
FIG. 11 illustrates a case where a maximum dimension in the Y direction is measured using dot group data.

The dot group data obtained through the three-dimensional imaging device are a data file containing, as a dot group, a large number of three-dimensional coordinates obtained by automatically measuring an object surface. That is, each dot constituting the dot group includes three-dimensional coordinate information. Thus, when an image of the take-out head 60 illustrated in FIG. 10A is captured by the three-dimensional imaging device, dot group data illustrated in FIG. 10B are obtained. Each dot includes three-dimensional coordinate information. Thus, as illustrated in FIG. 10C, the maximum dimension determination section 98 calculates the coordinate values of a dot with the largest coordinate in the X direction and a dot with the smallest coordinate in the X direction, among dots in the dot group data at the same depth in the X direction (having the same Y coordinate value), and determines the difference between such coordinate values as a maximum dimension Xm in the X direction. In addition, the maximum dimension determination section 98 calculates the coordinate values of a dot with the largest coordinate in the Z direction and a dot with the smallest coordinate in the Z direction, among dots in the dot group data at the same depth in the Z direction (having the same Y coordinate value), and determines the difference between such coordinate values as a maximum dimension Zm in the Z direction. Next, as illustrated in FIG. 11, the maximum dimension determination section 98 calculates the coordinate values of a dot with the largest coordinate in the Y direction and a dot with the smallest coordinate in the Y direction, among dots in the dot group data acquired by the second dot group data acquisition section 101B at the same depth in the Y direction (having the same X coordinate value), and determines the difference between such coordinate values as a maximum dimension Ym in the Y direction. In this manner, the three-dimensional maximum dimensions Xm, Ym, and Zm of the take-out head 60 can be obtained from the dot group data. After the maximum dimensions are obtained, the maximum dimensions may be used as in the first embodiment. If portions with maximum dimensions are known from the characteristics of the shape of the take-out head through advance observation, as a matter of course, maximum dimensions may be calculated by obtaining coordinate values from specific dot group data in a pinpoint manner without collecting data on dots at the same depth as discussed earlier. A known measurement technique may be used to measure maximum dimensions on the basis of images. With the above example, it is possible to minimize a measurement error due to the difference in the degree of proficiency among operators. When captured image data are used, maximum dimensions can be also measured by comparing a normal image of the take-out head (attachment) and a captured image thereof to measure maximum dimensions automatically from the difference between such images, or using AI technology which is good at image recognition. As a result, measurement can be automated.

(Possibility of Use, Teaching, and Die Change)

The maximum dimensions measured as described above may be used as desired. In the embodiment described above, it is determined, on the basis of information on the three-dimensional geometry of the take-out head 60, whether or not the take-out head is appropriate for use in work before teaching is performed by operating the teaching section 91, and an alarm is output from the possibility-of-use determination section 93 if the take-out head 60 is not usable. That is, it is determined beforehand whether the take-out head 60 possibly collides with a surrounding object while moving when teaching is executed, and an alarm is issued if there is no possibility of use of the take-out head 60.

If the maximum dimesnions of an attachment to be replaced are measured using the method according to the present invention when replacing a die, it is possible to know, before work is started, whether or not a new attachment is the correct one for replacement, or whether the geometry of the attachment has not been varied through repair etc. As a result, there is no possibility to break the die, the take-out head, etc. during teaching or a die change.

The data storage section 92 stores, beforehand, information on the dimension of the gap between the fixed die and the movable die, information on the dimension of a projection of the die in the die, information on the maximum dimensions of the die previously measured before work, etc. The possibility-of-use determination section 93 determines, on the basis of such information and the measured maximum dimensions, the possibility of use of the attachment, that is, whether or not the attachment is usable in the current work.

(Others)

While the method according to the present invention has been described using an apparatus for taking out a molded product as an example of the orthogonal three-axis robot in the embodiment described above, it is a matter of course that the present invention is also applicable to orthogonal three-axis robots to be used for other purposes.

INDUSTRIAL APPLICABILITY

With the present invention, it is possible to take appropriate measures before an orthogonal three-axis robot starts work, even if the dimensions or the mounting state of an attachment mounted to a work frame of the robot is different, since the three-dimensional geometry of the attachment is measured with the attachment being mounted to the work frame before the attachment starts work.

What is claimed is:

1. A method of measuring three-dimensional geometry of an attachment mounted to a work frame of an orthogonal three-axis robot having operation shafts extending in an X direction, a Y direction, and a Z direction, the method comprising:
    measuring a maximum dimension of the attachment in the X direction, a maximum dimension of the attachment in the Y direction, and a maximum dimension of the attachment in the Z direction on the basis of an image of the attachment captured by at least one imaging device before the attachment starts work with the attachment being mounted to the work frame of the orthogonal three-axis robot;
    wherein:
    an imaging system including the at least one imaging device includes a first imaging device configured to obtain a first image of the attachment in such a posture that allows measurement of the maximum dimension of the attachment in the X direction and the maximum dimension of the attachment in the Z direction, a second imaging device configured to obtain a second image of the attachment in such a posture that allows measurement of the maximum dimension of the attachment in the Y direction and the maximum dimension of the attachment in the Z direction, and an image display device that includes a screen with indicators on orthogonal coordinate axes for displaying the first image or the second image;
    the orthogonal three-axis robot includes a Y-direction drive source operable to move the work frame in the Y direction, a Y-direction movement amount measurement unit, a Z-direction drive source operable to move the work frame in the Z direction, a Z-direction movement amount measurement unit, an X-direction drive source operable to move the work frame in the X direction, and an X-direction movement amount measurement unit; and
    the method comprises
    measuring the maximum dimension in the Z direction on the basis of a distance measured by the Z-direction movement amount measurement unit during a period since an outermost end portion, on one side in the Z direction, of the attachment in the first image crosses a reference line on the screen until an outermost end portion, on the other side in the Z direction, of the attachment crosses the reference line while the attachment is moved in the Z direction by driving the Z-direction drive source with directions in which the orthogonal coordinate axes for the indicators on the screen extend coinciding with the X direction and the Z direction in the first image,
    measuring the maximum dimension in the X direction on the basis of a distance measured by the X-direction movement amount measurement unit during a period since an outermost end portion, on one side in the X direction, of the attachment in the first image crosses a reference line on the screen until an outermost end portion, on the other side in the X direction, of the attachment crosses the reference line while the attachment is moved in the X direction by driving the X-direction drive source with directions in which the orthogonal coordinate axes for the indicators on the screen extend coinciding with the X direction and the Z direction in the first image, and
    measuring the maximum dimension in the Y direction on the basis of a distance measured by the Y-direction movement amount measurement unit during a period since an outermost end portion, on one side in the direction, of the attachment in the second image crosses a reference line on the screen until an outermost end portion, on the other side in the Y direction, of the attachment crosses the reference line while the attachment is moved in the Y direction by driving the Y-direction drive source with directions in which the orthogonal coordinate axes for the indicators on the screen extend coinciding with the Y direction and the Z direction in the second image.

2. The method of measuring three-dimensional geometry of an attachment according to claim 1, wherein a three-dimensional position coordinate of the at least one imaging device at a time of capturing an image of the attachment, a three-dimensional position coordinate of the attachment of which an image is captured, a field angle of the imaging device, and a mounting posture of the attachment to the work frame are determined so that the image includes information needed to measure the three-dimensional geometry of the attachment.

3. A method of determining a possibility of use of an attachment, comprising:
    measuring information on three-dimensional geometry of the attachment using the method according to claim 2; and
    determining, on the basis of the information on the three-dimensional geometry, whether or not use of the attachment in the work is appropriate, and issuing an alarm if the attachment is not usable.

4. A method of determining a possibility of use of an attachment, comprising:
    measuring information on three-dimensional geometry of the attachment using the method according to claim 1; and determining, on the basis of the information on the three-dimensional geometry, whether or not use of the attachment in the work is appropriate, and issuing an alarm if the attachment is not usable.

5. The method of determining a possibility of use of an attachment according to claim 4, wherein whether or not the use of the attachment is appropriate is determined on the basis of a possibility of a collision of the attachment with a surrounding object during movement of the attachment, or a difference of the information from previous dimension information.

6. The method of determining a possibility of use of an attachment according to claim 5, wherein the attachment is constituted with an accessory part including an air tube for providing power to the attachment or a wire for providing a control signal or power to the attachment.

7. A method of teaching or a die change of an apparatus for taking out a molded product, comprising stopping the teaching or the die change when an alarm is issued by the method of determining a possibility of use of an attachment according to claim 4,
wherein whether or not the use of the attachment is appropriate is determined on the basis of a possibility of a collision of the attachment with a surrounding object during movement of the attachment, or a difference of the information from previous dimension information.

8. A method of determining a possibility of use of an attachment, comprising:
measuring information on three-dimensional geometry of the attachment using the method according to claim 1; and
determining, on the basis of the information on the three-dimensional geometry, whether or not use of the attachment in the work is appropriate, and issuing an alarm if the attachment is not usable.

9. The method of measuring three-dimensional geometry of an attachment according to claim 1,
wherein the orthogonal three-axis robot is a robot for taking out a molded product;
wherein the work frame is an approach frame operable to advance into a die of a molding machine with the attachment being mounted to a distal end of the approach frame;
wherein a pull-out direction in which the die mounted to the molding machine is pulled out is defined as the Y direction, an up-down direction that is orthogonal to the pull-out direction is defined as the Z direction, and a direction that is orthogonal to the Y direction and the Z direction is defined as the X direction; and
wherein the method further comprises measuring the maximum dimension of the attachment in the Y direction, the maximum dimension of the attachment in the Z direction, and the maximum dimension of the attachment in the X direction on the basis of data on the image of the attachment captured by the at least one imaging device before the attachment is inserted into the die with the attachment being mounted to the approach frame.

10. A method of measuring three-dimensional geometry of an attachment mounted to a work frame of an orthogonal three-axis robot having operation shafts extending in an X direction, a Y direction, and a Z direction, the method comprising:
measuring a maximum dimension of the attachment in the X direction, a maximum dimension of the attachment in the Y direction, and a maximum dimension of the attachment in the Z direction on the basis of an image of the attachment captured by at least one imaging device before the attachment starts work with the attachment being mounted to the work frame of the orthogonal three-axis robot; wherein:
the at least one imaging device is a three-dimensional imaging device configured to measure an object surface to output dot group data including a large number of dots each having a three-dimensional coordinate; and
the method further comprises:
the three-dimensional imaging device acquiring first dot group data that allow measurement of the maximum dimension of the attachment in the X direction and the maximum dimension of the attachment in the Z direction, and second dot group data that allow measurement of the maximum dimension of the attachment in the Y direction and the maximum dimension of the attachment in the Z direction,
measuring the maximum dimension in the Z direction on the basis of a coordinate of a dot positioned at an outermost end, on one side in the Z direction, among the dots in the first dot group data, and a coordinate of a dot positioned at an outermost end, on the other side in the Z direction, among the dots in the first dot group data,
measuring the maximum dimension in the X direction on the basis of a coordinate of a dot positioned at an outermost end, on one side in the X direction, among the dots in the first dot group data, and a coordinate of a dot positioned at an outermost end, on the other side in the X direction, among the dots in the first dot group data, and
measuring the maximum dimension in the Y direction on the basis of a coordinate of a dot positioned at an outermost end, on one side in the Y direction, among the dots in the second dot group data, and a coordinate of a dot positioned at an outermost end, on the other side in the Y direction, among the dots in the second dot group data.

11. A method of determining a possibility of use of an attachment, comprising:
measuring information on three-dimensional geometry of the attachment using the method according to claim 10; and
determining, on the basis of the information on the three-dimensional geometry, whether or not use of the attachment in the work is appropriate, and issuing an alarm if the attachment is not usable.

12. A system for measuring three-dimensional geometry of an attachment mounted to a work frame of an orthogonal three-axis robot having operation shafts extending in an X direction, a Y direction, and a Z direction, the system comprising:
a processor,
wherein the processor constitutes a dimension measurement section for measuring a maximum dimension of the attachment in the X direction, a maximum dimension of the attachment in the Y direction, and a maximum dimension of the attachment in the Z direction on the basis of an image of the attachment captured by at least one imaging device before the attachment starts work with the attachment being mounted to the work frame of the orthogonal three-axis robot;
an imaging system including the at least one imaging device includes a first imaging device configured to obtain a first image of the attachment in such a posture that allows measurement of the maximum dimension of the attachment in the X direction and the maximum dimension of the attachment in the Z direction, a second imaging device configured to obtain a second image of the attachment in such a posture that allows measurement of the maximum dimension of the attachment in the Y direction and the maximum dimension of the attachment in the Z direction, and an image display device that includes a screen with indicators on orthogonal coordinate axes for displaying the first image or the second image;

the orthogonal three-axis robot includes a Y-direction drive source operable to move the work frame in the Y direction, a Y-direction movement amount measurement unit, a Z-direction drive source operable to move the work frame in the Z direction, a Z-direction movement amount measurement unit, an X-direction drive source operable to move the work frame in the X direction, and an X-direction movement amount measurement unit; and the dimension measurement section is configured to:
  measure, through computation, the maximum dimension in the Z direction on the basis of a distance measured by the Z-direction movement amount measurement unit during a period since an outermost end portion, on one side in the Z direction, of the attachment in the first image crosses a reference line on the screen until an outermost end portion, on the other side in the Z direction, of the attachment crosses the reference line while the attachment is moved in the Z direction by driving the Z-direction drive source with directions in which the orthogonal coordinate axes for the indicators on the screen extend coinciding with the X direction and the Z direction in the first image,
  measure, through computation, the maximum dimension in the X direction on the basis of a distance measured by the X-direction movement amount measurement unit during a period since an outermost end portion, on one side in the X direction, of the attachment in the first image crosses a reference line on the screen until an outermost end portion, on the other side in the X direction, of the attachment crosses the reference line while the attachment is moved in the X direction by driving the X-direction drive source with directions in which the orthogonal coordinate axes for the indicators on the screen extend coinciding with the X direction and the Z direction in the first image, and
  measure, through computation, the maximum dimension in the Y direction on the basis of a distance measured by the Y-direction movement amount measurement unit during a period since an outermost end portion, on one side in the Y direction, of the attachment in the second image crosses a reference line on the screen until an outermost end portion, on the other side in the Y direction, of the attachment crosses the reference line while the attachment is moved in the Y direction by driving the Y-direction drive source with directions in which the orthogonal coordinate axes for the indicators on the screen extend coinciding with the Y direction and the Z direction in the second image.

13. A system for measuring three-dimensional geometry of an attachment mounted to a work frame of an orthogonal three-axis robot having operation shafts extending in an X direction, a Y direction, and a Z direction, the system comprising:
  a processor,
  wherein the processor constitutes a dimension measurement section for measuring a maximum dimension of the attachment in the X direction, a maximum dimension of the attachment in the Y direction, and a maximum dimension of the attachment in the Z direction on the basis of an image of the attachment captured by at least one imaging device before the attachment starts work with the attachment being mounted to the work frame of the orthogonal three-axis robot;
  the at least one imaging device is a three-dimensional imaging device configured to measure an object surface to output dot group data including a large number of dots each having a three-dimensional coordinate;
  the system further comprises:
    a first dot group data acquisition section configured to acquire, from the three-dimensional imaging device, first dot group data that allow measurement of the maximum dimension of the attachment in the X direction and the maximum dimension of the attachment in the Z direction, and
    a second dot group data acquisition section configured to acquire second dot group data that allow measurement of the maximum dimension of the attachment in the Y direction and the maximum dimension of the attachment in the Z direction; and
  the dimension measurement section includes a maximum dimension determination section configured to:
    calculate the maximum dimension in the Z direction on the basis of a coordinate of a dot positioned at an outermost end, on one side in the Z direction, among the dots in the first dot group data, and a coordinate of a dot positioned at an outermost end, on the other side in the Z direction, among the dots in the first dot group data,
    calculate the maximum dimension in the X direction on the basis of a coordinate of a dot positioned at an outermost end, on one side in the X direction, among the dots in the first dot group data, and a coordinate of a dot positioned at an outermost end, on the other side in the X direction, among the dots in the first dot group data, and
    calculate the maximum dimension in the Y direction on the basis of a coordinate of a dot positioned at an outermost end, on one side in the Y direction, among the dots in the second dot group data, and a coordinate of a dot positioned at an outermost end, on the other side in the Y direction, among the dots in the second dot group data.

* * * * *